United States Patent
Bondioli

(10) Patent No.: US 12,553,476 B2
(45) Date of Patent: Feb. 17, 2026

(54) PROTECTION SYSTEM FOR A DRIVE SHAFT AND DRIVE SHAFT COMPRISING SAID PROTECTION SYSTEM

(71) Applicants: Lea Lusetti, Suzzara (IT); Carlo Bondioli, Suzzara (IT); Claudio Bondioli, Borgo a Virgilio (IT)

(72) Inventor: Edi Bondioli

( * ) Notice: Subject to any disclaimer, the term of this patent is extended or adjusted under 35 U.S.C. 154(b) by 489 days.

(21) Appl. No.: 18/069,283

(22) PCT Filed: Jun. 21, 2021

(86) PCT No.: PCT/EP2021/066824
§ 371 (c)(1),
(2) Date: Dec. 21, 2022

(87) PCT Pub. No.: WO2021/259856
PCT Pub. Date: Dec. 30, 2021

(65) Prior Publication Data
US 2023/0213070 A1    Jul. 6, 2023

(30) Foreign Application Priority Data
Jun. 22, 2020 (IT) .......... 102020000014905

(51) Int. Cl.
*F16D 3/84* (2006.01)
*A01B 71/08* (2006.01)
(52) U.S. Cl.
CPC ............ *F16D 3/845* (2013.01); *F16D 3/848* (2013.01); *A01B 71/08* (2013.01); *F16C 2310/00* (2013.01)

(58) Field of Classification Search
CPC ......... F16D 3/845; F16D 3/848; A01B 71/08; F16C 2310/00
(Continued)

(56) References Cited

U.S. PATENT DOCUMENTS 5,800,271 A * 9/1998 Herchenbach .......... F16D 3/841
464/172
6,123,622 A  9/2000 Mikeska et al.
(Continued)

FOREIGN PATENT DOCUMENTS

DE    B208541 C1  6/1983
EP    0908083 A1  4/1999
(Continued)

*Primary Examiner* — Greg Binda
(74) *Attorney, Agent, or Firm* — McGlew and Tuttle, P.C.

(57) ABSTRACT

The protection system (5) comprises a first tubular member (13) and a second tubular member (15) which can be slidably inserted into each other and a protection (8) at one end of the first tubular member (13). The protection comprises a protective boot (40) and a first annular element (21) fixed to the first tubular member (13). Further provided for is a second annular element (33) which can be torsionally coupled to the first annular element (21) and which can be decoupled therefrom by means of a mutual movement between the first annular element (21) and the second annular element (33) in a direction approximately parallel to the axis (A-A) of the first tubular member (13). The second annular element (33) is coupled to the protective boot (40) which is provided with members (49) for coupling to a stationary plate (51) which can be connected to a power take-off (9). A drive shaft provided with such a protection system is also described.

25 Claims, 9 Drawing Sheets

(58) Field of Classification Search
USPC .......................................................... 464/172
See application file for complete search history.

(56)     References Cited

U.S. PATENT DOCUMENTS

| | | | |
|---|---|---|---|
| 6,186,901 B1 | 2/2001 | Bondioli | |
| 2016/0252139 A1* | 9/2016 | Colombini | .............. F16D 3/848 |
| 2020/0166178 A1* | 5/2020 | Gerritzen | ................ F16D 3/848 |

FOREIGN PATENT DOCUMENTS

| | | |
|---|---|---|
| EP | 2868941 A1 | 5/2015 |
| EP | 3088759 A2 | 11/2016 |
| GB | 2356031 A | 5/2001 |
| WO | 9806955 A1 | 2/1998 |
| WO | 9806956 A1 | 2/1998 |

\* cited by examiner

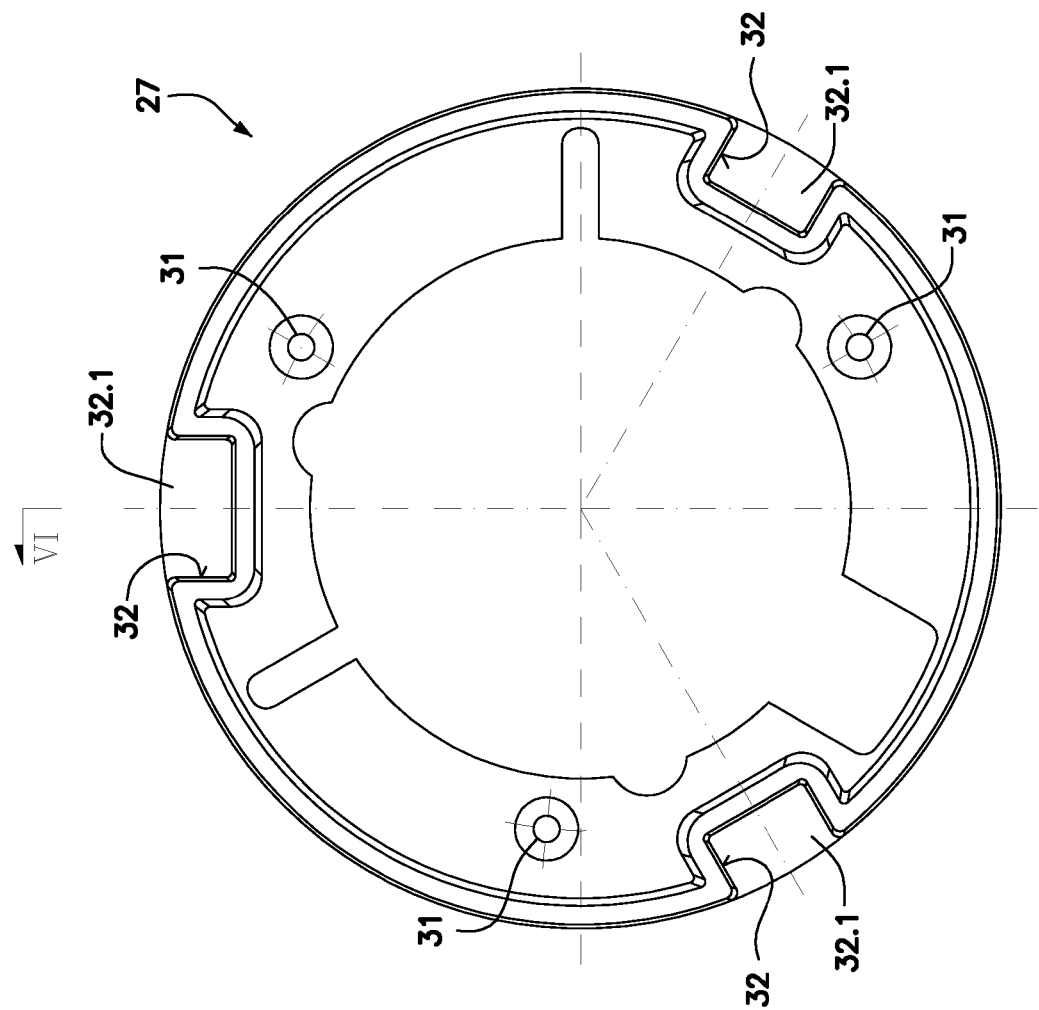
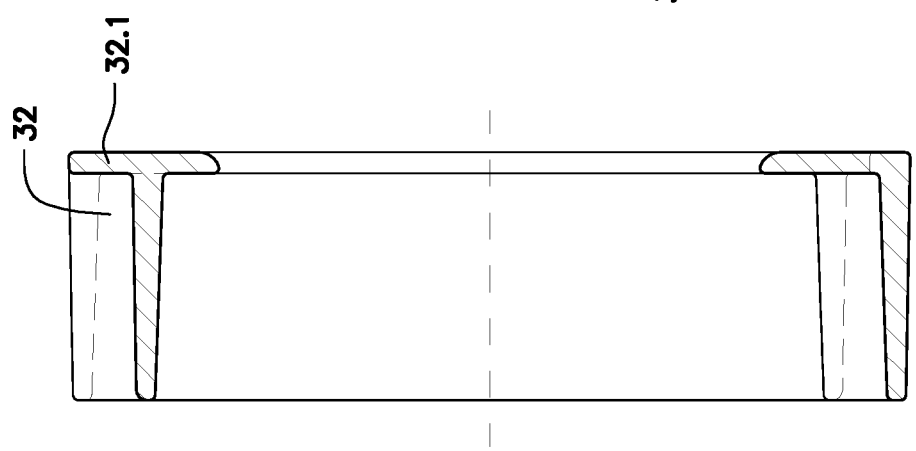

PROTECTION SYSTEM FOR A DRIVE SHAFT AND DRIVE SHAFT COMPRISING SAID PROTECTION SYSTEM

TECHNICAL FIELD

The present invention relates to drive shafts, in particular drive shafts for use in agricultural machinery, and to accident prevention protections thereof. More particularly, herein described is an accident prevention protection system for drive shafts and the like.

PRIOR ART

To connect a power take-off, for example of a tractor, to a load, for example a tractor-drawn machine, telescopic drive shafts, capable of extending and retracting by means of two tubular elements slidably inserted into each other and angularly coupled to each other, are frequently used. At the ends, the drive shaft usually comprises two universal joints, for connection to the power take-off and to the driven machine, respectively. These rotating members must be protected by protection systems consisting of non-rotating components to prevent the risk of serious accidents, which can occur in the event of accidental contact of the rotating members by an operator.

The drive shafts are protected by a protection system comprising two tubular members telescopically coupled and slidable into each other, at whose free ends protective boots for the two end universal joints are provided. This protection system is normally connected, for example by means of a chain, to a non-rotating component of the tractor or of the driven machine, so as not to be drawn in rotation by the drive shaft located therein. Accident prevention protection systems of this type are disclosed in U.S. Pat. Nos. 6,186,901, 6,123,622 and EP 2.868.941, for instance.

Accident prevention protection systems for the joint of a drive shaft and the relative power take-off are disclosed in EP0908083 and EP3088759.

An improved accident prevention protection system is disclosed in WO98/06955. In this known system, in order to protect the power take-off, to which one of the universal joints of the drive shaft is also coupled, a counter-boot is provided, applied to a stationary plate, associated with the power take-off. This protection system is particularly safe, given that it also effectively protects against the risk of accidental contact with the power take-off.

Between the boot and the counter-boot there remains an open annular space, which could be a residual risk factor. Furthermore, the counter-boot is an element that can be inadvertently lost when using the drive shaft.

U.S. Pat. No. 6,123,622 discloses a protection for a telescopic drive shaft, comprising two protective tubes slidable into each other and to which a first and a second protective boot are coupled. Each protective boot comprises a first annular element, with which the boot is axially fixed to the respective protective tube. One of the two protective boots is configured to engage a stationary hub surrounding a power take-off. The connection between the boot and the stationary hub is obtained by means of a cylindrical member angularly fixed to the hub of the power take-off. The boot is connected to the cylindrical member by means of a ring fixed to the distal end of the boot, opposite to the proximal end of the boot, i.e. the end opposite to the end of the boot that is fixed to the tube of the drive shaft protection.

This protection is affected by some limitations as it does not allow easy access to the end universal joint which is located between the telescopic shaft and the power take-off. In particular, systems for allowing the axial sliding moving away from the universal joint are not disclosed.

U.S. Pat. No. 5,800,271 discloses a protection with a boot that only partially covers the end universal joint of a drive shaft. The protective boot can be axially released from the universal joint to be retracted along the tubular members of the protection and make the joint accessible. This protection does not cover the transmission entirely.

Therefore, there is a need to provide an accident prevention protection system with even better performance and more practical to use.

SUMMARY OF THE INVENTION

In order to fully or partly overcome at least some of the drawbacks of the protection systems of the state of the art, a protection system is provided which comprises a first tubular member and a second tubular member which can be slidably inserted into each other, as well as at least one protection at one end of the first tubular member. The protection comprises a protective boot and a first annular element fixed to the first tubular member. Furthermore, the protection comprises a second annular element, which can be torsionally coupled to the first annular element (i.e. coupled so as not to allow rotation with respect thereto) and which can be decoupled from the first annular element by means of a mutual movement between the first annular element and the second annular element in a direction approximately parallel to the axis of the first tubular member. The second annular element is coupled to a first end of the protective boot.

The protective boot is provided with members for coupling to a stationary plate which can be connected to a non-rotating component of a machine, from which the power take-off, to which the drive shaft is applied, projects. The coupling members are fixed to a second end of the protective boot, opposite to the first end of the boot, to which the second annular element is coupled.

In this manner, the protective boot can slide axially along the tubular members of the protection system, by disengaging the second annular element from the first annular element through a simple sliding movement. Basically, while the first annular element remains in a fixed position with respect to the first tubular member, to which it is constrained, the second annular element can slide with respect to the first annular element along the axial extension of the two tubular members when the boot is not attached to the power take-off with the second end thereof.

With this arrangement, the protective boot can be attached to the machine, on which the power take-off is located, which can be a drive shaft or a driven shaft, for example the tractor power take-off or the shaft of a driven machine. When the drive shaft is to be disconnected from the power take-off, that is from the drive machine (tractor) or from the driven machine, the protective boot can be disconnected from the power take-off by axially disengaging the second end thereof from the non-rotating component surrounding the power take-off. Once the axial disengagement has been carried out, the protective boot can be retracted, sliding along the tubular members which protect the drive shaft, leaving the connection joint between the drive shaft and the drive shaft or the driven shaft of the power take-off completely accessible. In this case, the disconnection operations are simplified. A similar advantage is obtained when the drive shaft is to be attached to the power take-off of the drive machine or of the driven machine.

The first annular element may advantageously be provided with members for axial coupling to the first tubular member, in proximity of the end thereof adjacent to the universal joint. The torsional coupling between the first protective tubular member and the protective boot can be obtained by means of a positive mechanical engagement which allows the free axial movement of the protective boot and of the second annular element with respect to the first annular element. In this manner, the protective boot can be made to slide axially along the protective tubular member, completely disengaging the universal joint, without having to use special equipment or tools and effortlessly.

In advantageous embodiments, the first annular element and the second annular element are coupled to each other by means of a positive mechanical engagement with at least one seat extending in the direction of the axis of the first tubular member and a tooth which can be slidably engaged in said seat. The extension in the axial direction of the seat allows mutual axial displacements between the protection and the drive shaft, which can occur during the normal use of the drive shaft, without the risk that the protective boot loses the torsional coupling with the tubular members for protecting the drive shaft.

In advantageous embodiments, the protective boot may comprise a flexible half-boot and a rigid half-boot, coupled to each other. In the present context, the expressions rigid and flexible are understood in a relative sense. The flexible half-boot is a half-boot that can undergo bending deformation to follow the relative movements of the mechanical members to which it is connected during normal use of the drive shaft. The stiffness of the rigid half-boot is such to remain substantially undeformed during the normal use of the drive shaft, that is when loaded by the normal loads applied to the protection during use.

Further advantageous features and embodiments of the protection are described hereinafter and set forth in the attached claims.

According to a further aspect, a telescopic drive shaft is provided, comprising: a first shaft portion and a second shaft portion, slidably inserted into each other and torsionally coupled to each other; a first universal joint fixed to one end of the first shaft portion; a second universal joint fixed to one end of the second shaft portion; and a protection system as outlined above, whose boot protects one of the two universal joints.

The drive shaft may comprise a further protective boot fixed to one end of the second tubular member of the protection system, to surround the other of said first universal joint and second universal joint.

BRIEF DESCRIPTION OF THE DRAWINGS

The invention will be clearer from the description and the attached drawings, which illustrate an embodiment provided by way of non-limiting example of the invention. More particularly, in the drawings:

FIG. 5 is a front view of one of the components of the first annular element of the end protection of the drive shaft;

FIG. 6 is a cross-section according to VI-VI of FIG. 5;

DETAILED DESCRIPTION

Figure 1:
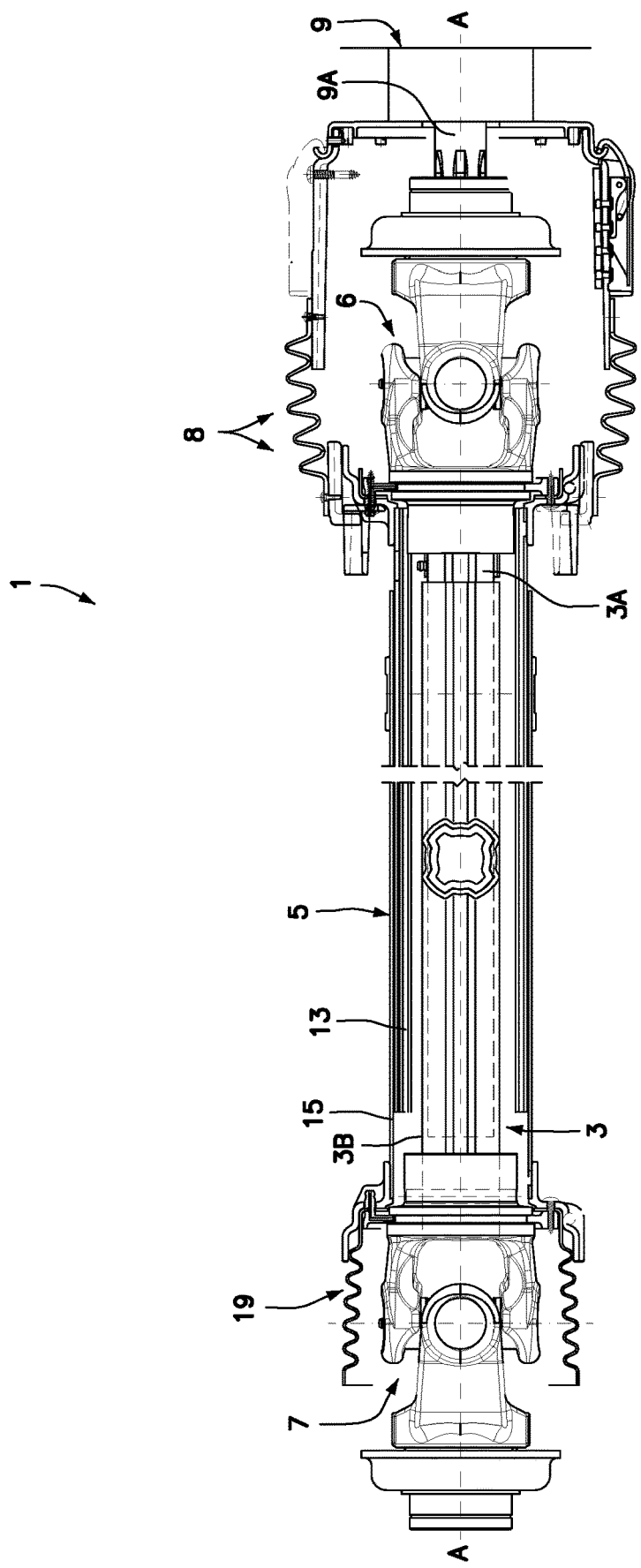
FIG. 1 is a longitudinal section of a drive shaft comprising a protection system according to the present invention.

FIG. 1 shows an overall view of a drive shaft with relative protection system, coupled to a power take-off, in a partially sectioned view according to a longitudinal plane, i.e. parallel to the rotation axis A-A of the drive shaft. The assembly consisting of the drive shaft 3 and the protection system 5 is indicated with 1. In a per se known manner, the drive shaft comprises a first shaft portion 3A and a second shaft portion 3B, inserted into each other and telescopically slidable with respect each other and torsionally coupled to each other, so as to transmit a torsional torque from one to the other. A first universal joint and a second end universal joint of the drive shaft 3 are indicated with 6 and 7. Reference number 9 indicates a fixed, i.e. non-rotating portion of a machine, protruding from which is a generic power take-off 9A, for example having a splined shaft coupled to the first universal joint 6. The structure of the drive shaft 3 is known per se and thus it will not be described in greater detail.

The protection system 5 comprises a first tubular member 13 and a second tubular member 15, inserted into each other and slidable with respect to each other in the direction of the axis A-A of the drive shaft 3. The two tubular members 13, 15 are torsionally coupled to each other so as not to be able to rotate with respect to each other about the axis A-A. For example, the two tubular members 13, 15 may have a non-circular cross-section.

In the illustrated embodiment, the first tubular member 13 is arranged inside the tubular member 15 and is axially constrained, as described below, to the first universal joint 6 and is associated with an end protection 8 of the first universal joint 6. The end protection 8 will be described in greater detail below.

The second tubular member 15 is axially constrained to the second universal joint 7 in a manner per se known. A protective boot 19 is integrally joined to the second tubular member 15 and surrounds the second universal joint 7. The protective boot 19 and the connection thereof to the second universal joint 7 are known and they can be designed, as disclosed in U.S. Pat. No. 6,186,901, for example.

Returning to the end protection 8, it comprises a first annular element 21 consisting of a plurality of elements described in greater detail below, which is rigidly connected to the first tubular member 13 and is axially coupled to the universal joint 6. To this end, a slider 23 may be provided, for example, which slidably engages in an annular groove 6.1 of the drive shaft 6. The slider 23 can be fixed in a bushing 25. In the illustrated embodiment, the bushing 25 comprises a first approximately cylindrical portion 25.1 with a larger diameter and a second approximately cylindrical portion 25.2 with a smaller diameter. The latter is rigidly coupled to the first tubular member 13.

Figure 7:
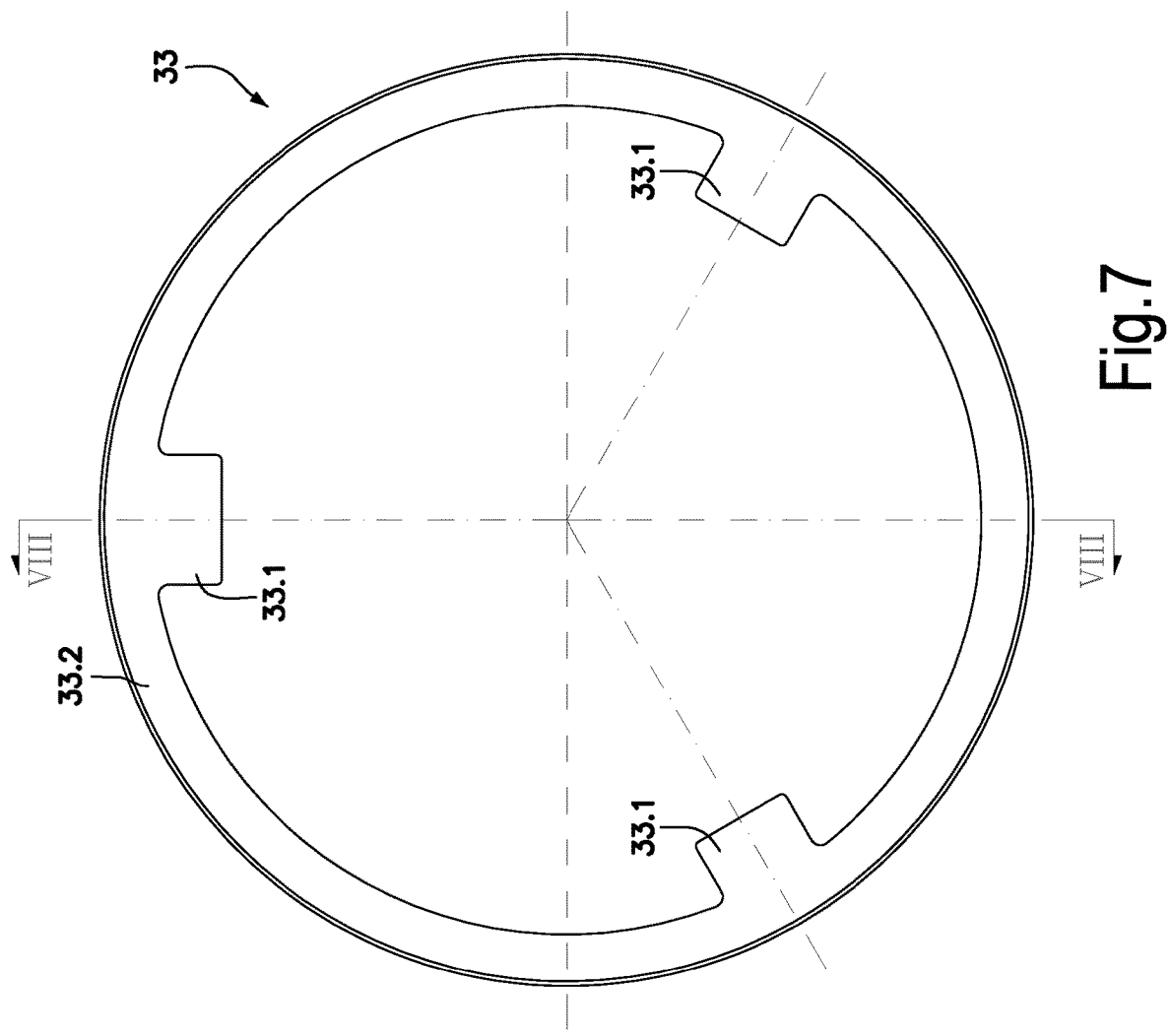
FIG. 7 is a front view of the second annular element of the end protection.
Figure 8:
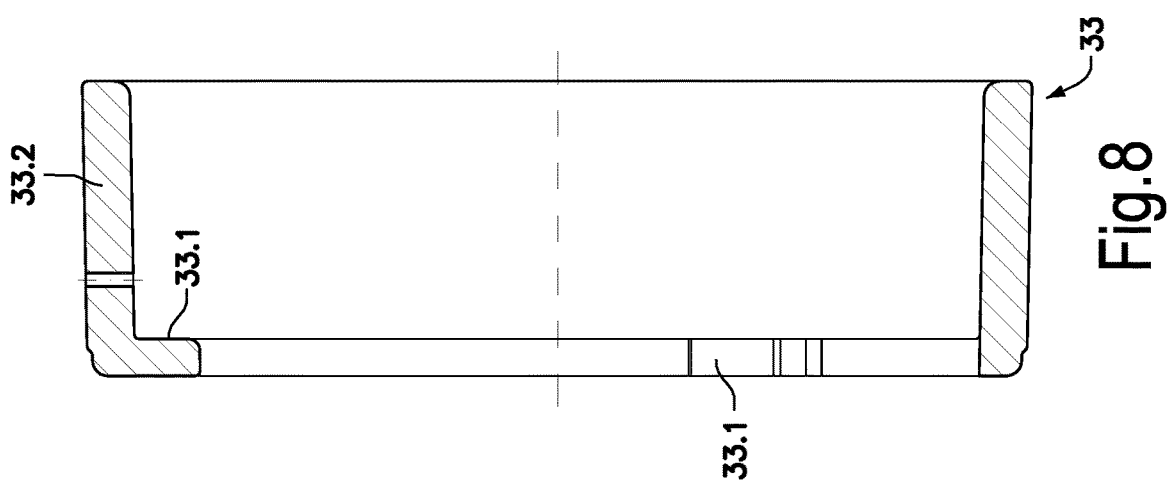
FIG. 8 is a cross-section according to VIII-VIII of FIG. 7.
Figure 9:
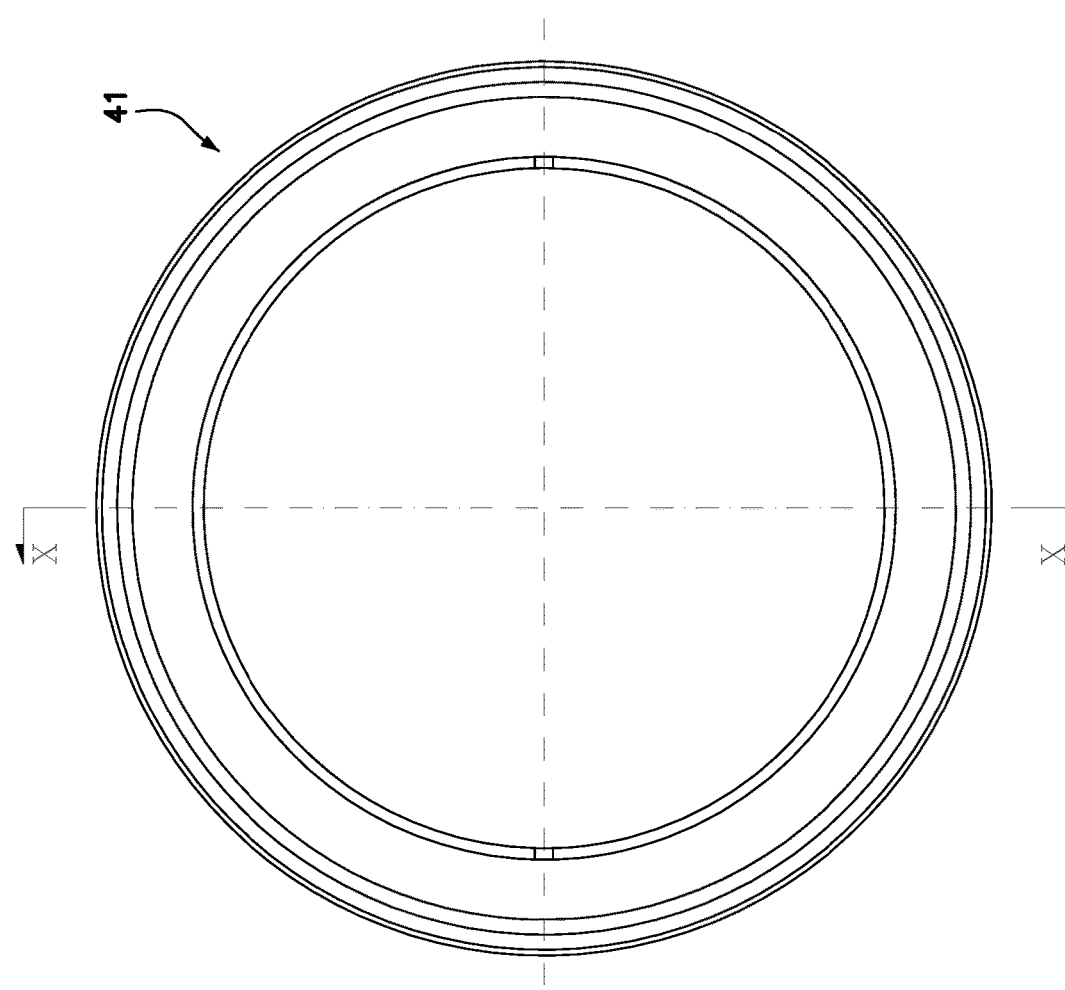
FIG. 9 is a front view of the flexible half-boot of the end protection.
Figure 10:
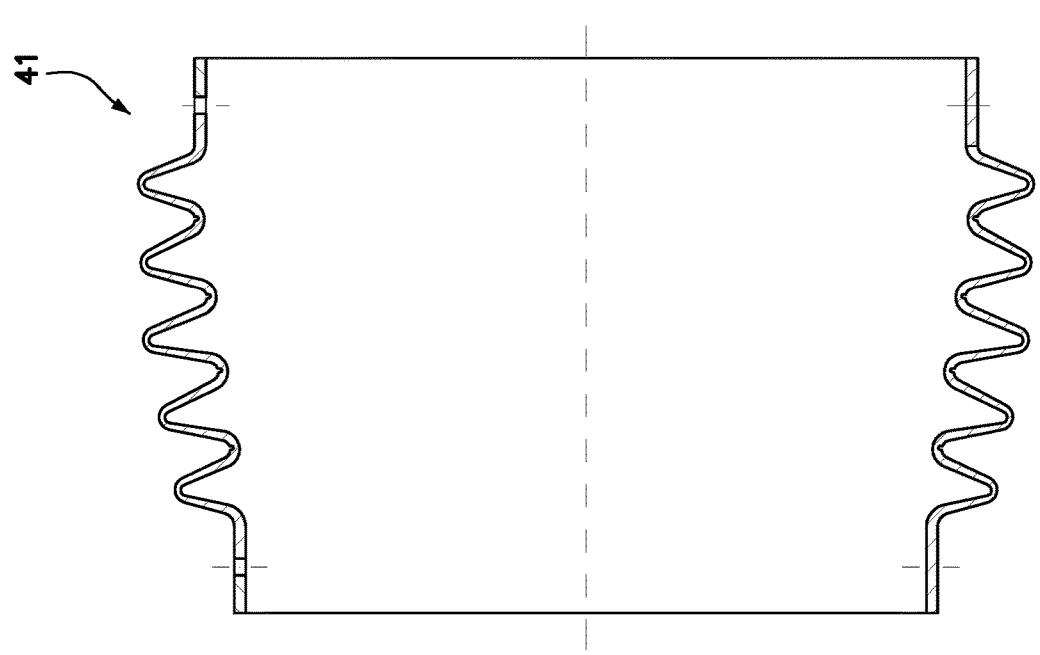
FIG. 10 is a cross-section according to X-X of FIG. 9.

The first annular element 21 further comprises a flange 27, rigidly connected to the bushing 25 and illustrated separately in FIGS. 5 and 6. The flange 27 can be fixed to the bushing 25 for example by means of screws 29, which are engaged in holes 31 of the flange 27. Characteristically, the flange 27 forms a plurality of slidable coupling seats 32 for coupling a second annular element 33 forming part of the end protection 8 and illustrated separately in FIGS. 7 and 8. The coupling seats 32 end with abutments 32.1 for the purposes set out below.

The second annular element 33 comprises teeth 33.1 projecting radially inwards from an approximately hollow cylindrical-shaped main body 33.2.

The teeth 33.1 and the coupling seats 32 form a torsional positive mechanical engagement between the first annular element 21 and the second annular element 33. When the teeth 33.1 are inserted into the coupling seats 32, the first annular element 21 and the second annular element 33 are angularly, i.e. torsionally, coupled and cannot rotate with respect to each other about the axis A-A of the drive shaft 1. Vice versa, by mutually sliding the second annular element 33 in axial direction, that is in the direction of the axis A-A with respect to the first annular element 25, the teeth 33.1 can be disengaged from the sliding seats 32, allowing mutual rotation.

A protective boot 40, which protects the entire universal joint 6 and the power take-off 9A, is integrally joined to the second annular element 33. In particular, the protective boot 40 comprises a first proximal end, that is close to the tubular members 13, 15, and a second distal end, i.e. facing away from the tubular members 13, 15. The second annular element is fixed to the proximal end of the protective boot, or in proximity thereof.

In the described embodiment, the protective boot 40 comprises a first flexible half-boot 41, for example made of corrugated rubber, and a second rigid half-boot 43, for example made of rigid plastic material. The definitions "flexible" and "rigid" with reference to the boot 40 are to be understood as relative definitions, in the sense that the half-boot 41 is flexible with respect to the half-boot 43. The proximal end of the protective boot 40 is formed by the flexible half-boot 41 and the distal end is formed by the rigid half-boot 43.

Figure 11:
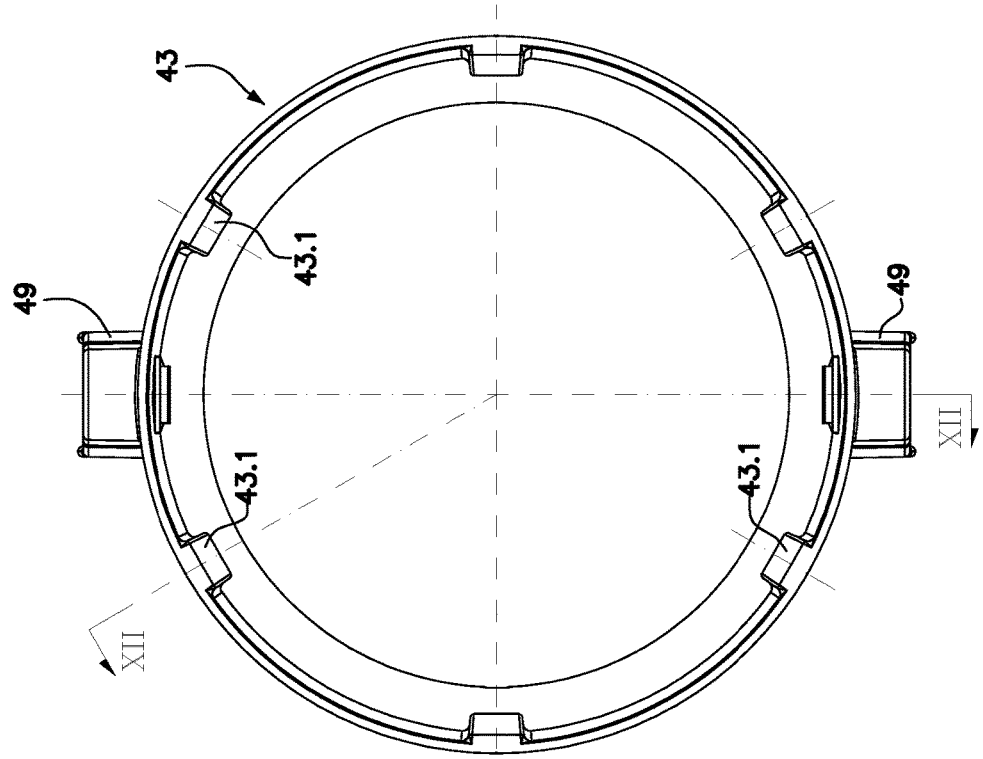
FIG. 11 is a front view of the rigid half-boot of the end protection.
Figure 12:
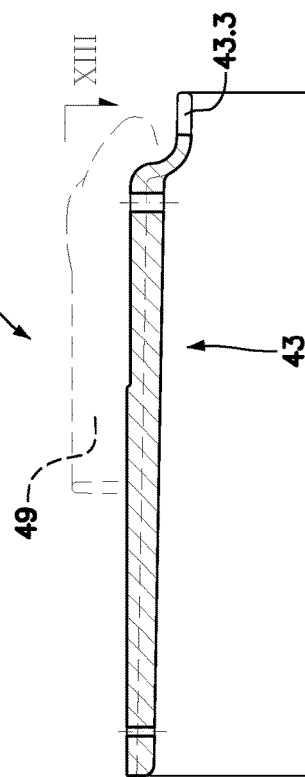
FIG. 12 is a cross-section according to XII-XII of FIG. 11.

Radial screws 45 may be provided in proximity of an end edge of the flexible half-boot 41, which surrounds the second annular element 33, to couple the protective boot 40 to the second annular element 33. The opposite edge of the flexible half-boot 41 can be fixed to the rigid half-boot 43 by means of radial screws 47. As visible in particular in FIGS. 11 and 12, the rigid half-boot 43 may be provided with ribs 43.1 extending approximately parallel to the axis A-A of the drive shaft 3. These ribs represent thicker portions of the rigid half-boot 43, into which the radial screws 47 can be inserted.

Figure 2:
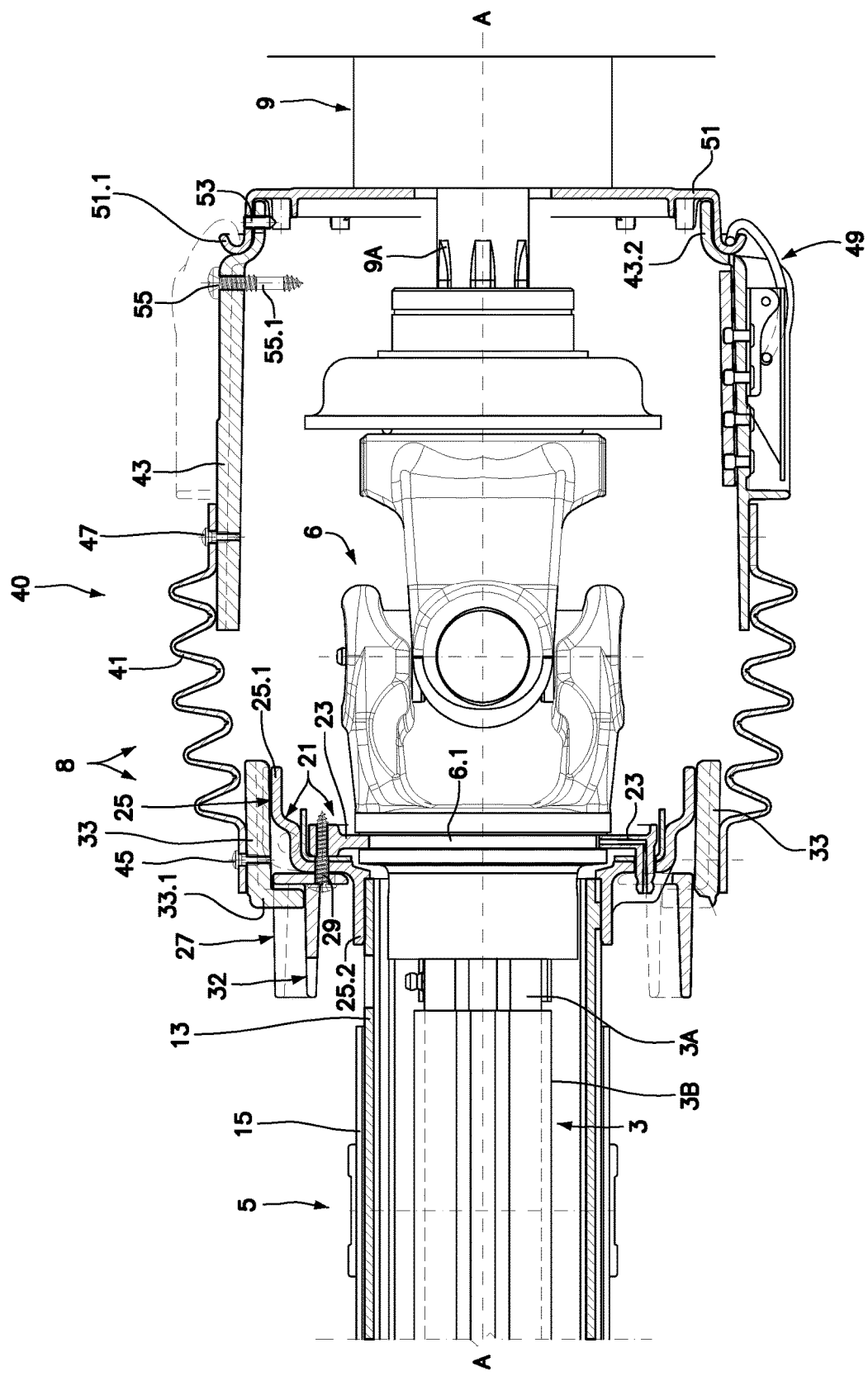
FIG. 2 is an enlargement of one end of the drive shaft of FIG. 1 with the relative end protection.
Figure 3:
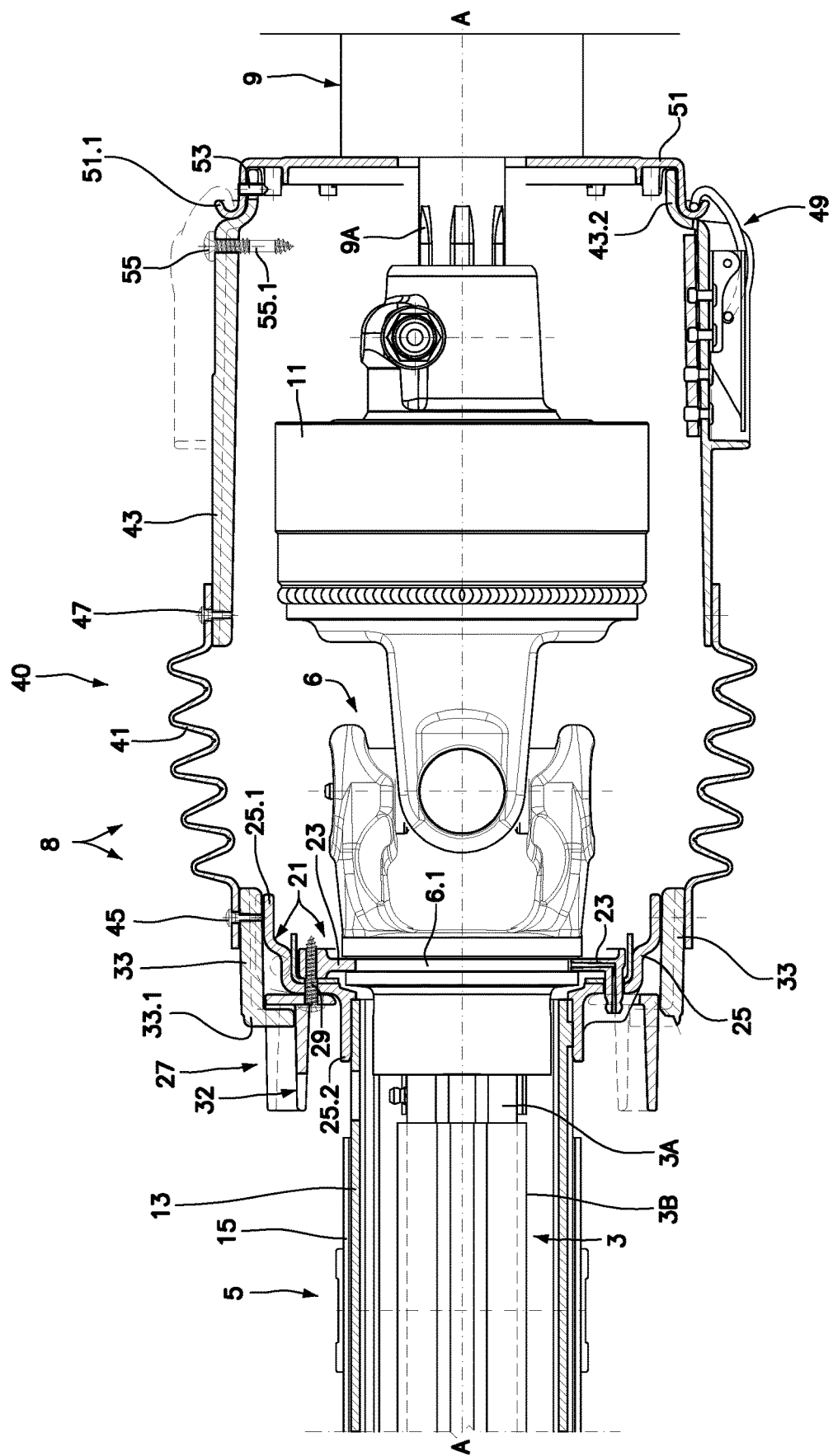
FIG. 3 is an enlargement similar to that of FIG. 2, in a different embodiment of the drive shaft.

In advantageous embodiments, the axial length of the protective boot 40 formed by the flexible half-boot 41 and by the half-boot 43 can be adapted to the shape of the drive shaft, as can be understood by comparing FIGS. 2 and 3. In FIG. 3, a safety device 11, for example a torque limiter, which increases the axial dimension, i.e. the overall length of the drive shaft 1, is arranged between the power take-off 9A and the universal joint 6. In order to adapt the axial dimension of the protective boot 40 to the different length of the drive shaft, the rigid half-boot 43 may have a variable axial length, which can be obtained for example by cutting a standard-length boot to size. Alternatively or additionally to this adaptation, it may be provided to vary the axial length of the protective boot 40 by overlapping the flexible half-boot 41 and the rigid half-boot 43 by a variable amount, as shown in FIGS. 2 and 3. This variation entails a displacement of the fixing point of the screws 47 in the axial direction with respect to the rigid half-boot 43: in FIG. 2 the screws 47 are further away from the edge of the rigid half-boot 43 facing toward the drive shaft 3 than the screws 47 in FIG. 3.

To the rigid half-boot 43 hooks 49 are constrained, which are used to hook the protective boot 40 to a stationary plate 51 that is fixed to the machine whereon the power take-off 9A is located. The plate 51 is stationary in the sense that it does not participate in driving the drive shaft 3 and the power take-off 9A in rotation. In the illustrated embodiment, the stationary plate 51 has a curved edge 51.1 in which the hooks 49 are engaged and the rigid half-boot 43 has an end edge 43.2 with a diameter smaller than the diameter of the remainder of the rigid half-boot 43, this end edge being inserted into the curved edge 51.1 and coaxially thereto.

Figure 13:
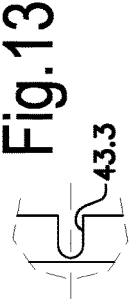
FIG. 13 is a view according to the arrow XIII of a detail of FIG. 12.
Figures 14, 15:
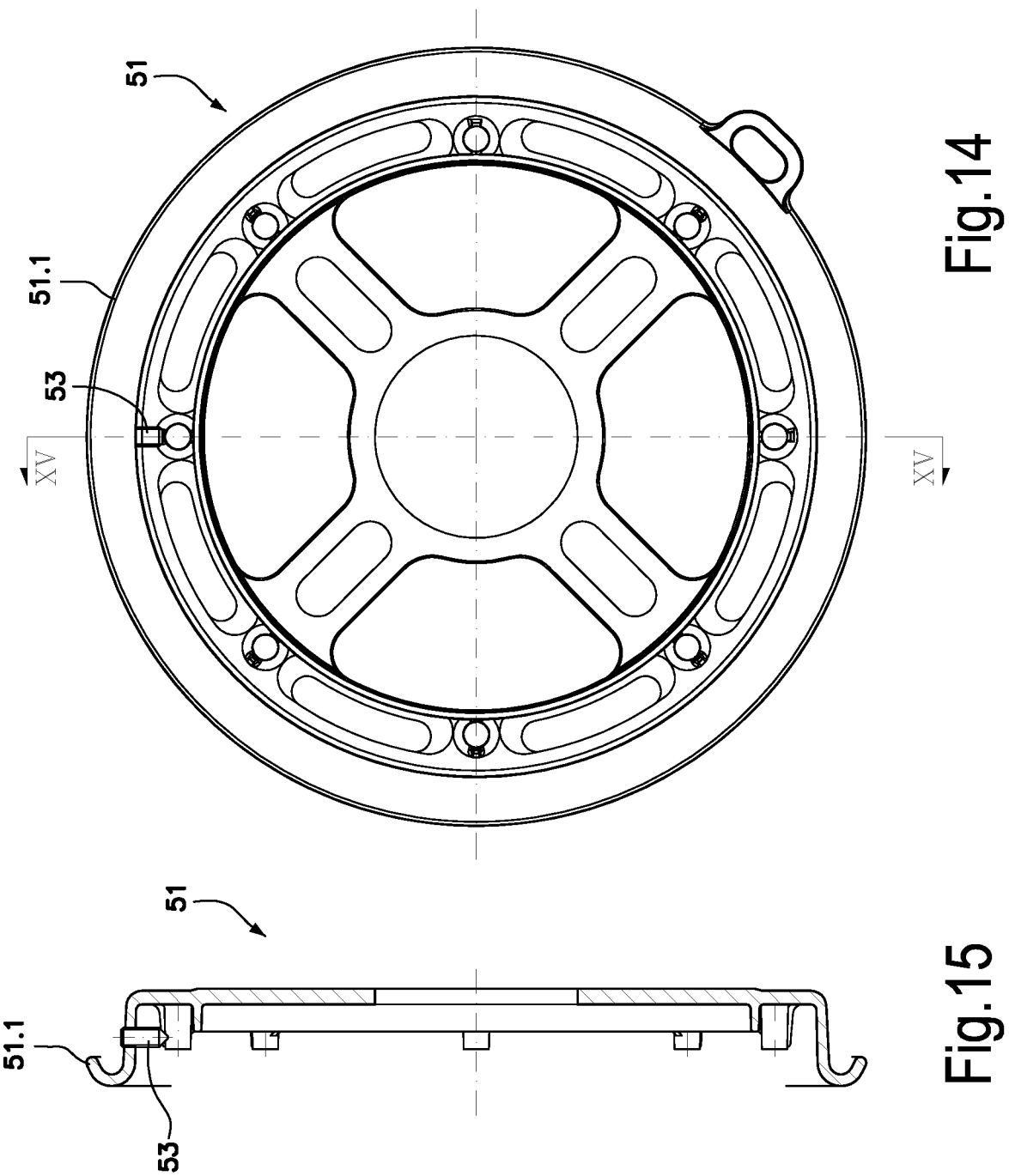
FIG. 14 is a front view of the stationary plate which can be connected to the power take-off.
FIG. 15 is a cross-section according to XV-XV of FIG. 14.

In advantageous embodiments, as shown in particular in the detail of FIG. 13, along the end edge 43.2 of the rigid half-boot 43 a coupling profile is provided, in this specific case a groove or recess 43.3, which is coupled to an anti-rotation member integrally joined to the stationary plate 51. In the illustrated embodiment, the anti-rotation member comprises a screw 53, shown in detail in FIGS. 14 and 15.

An end-stop device, for example a radial screw 55, screwed in proximity of the edge 43.2 of the rigid half-boot 43 is associated with the rigid half-boot 43. In the illustrated embodiment, the radial screw 55 has a thread interrupted in 55.1, i.e. a portion of the core or stem thereof which is non-threaded. This prevents the screw 55 from being inadvertently lost by unscrewing from the rigid half-boot 43. The screw 55 forms an anti-slip-off abutment which prevents the protective boot 40 from slipping off as shown from FIG. 4: as a matter of fact, the axial sliding movement of the protective boot 40 along the first annular element 21 is limited by the screw 55, which abuts against the edge facing toward the power take-off 9A of the bushing 25, which belongs to the first annular element 21.

Figure 4:
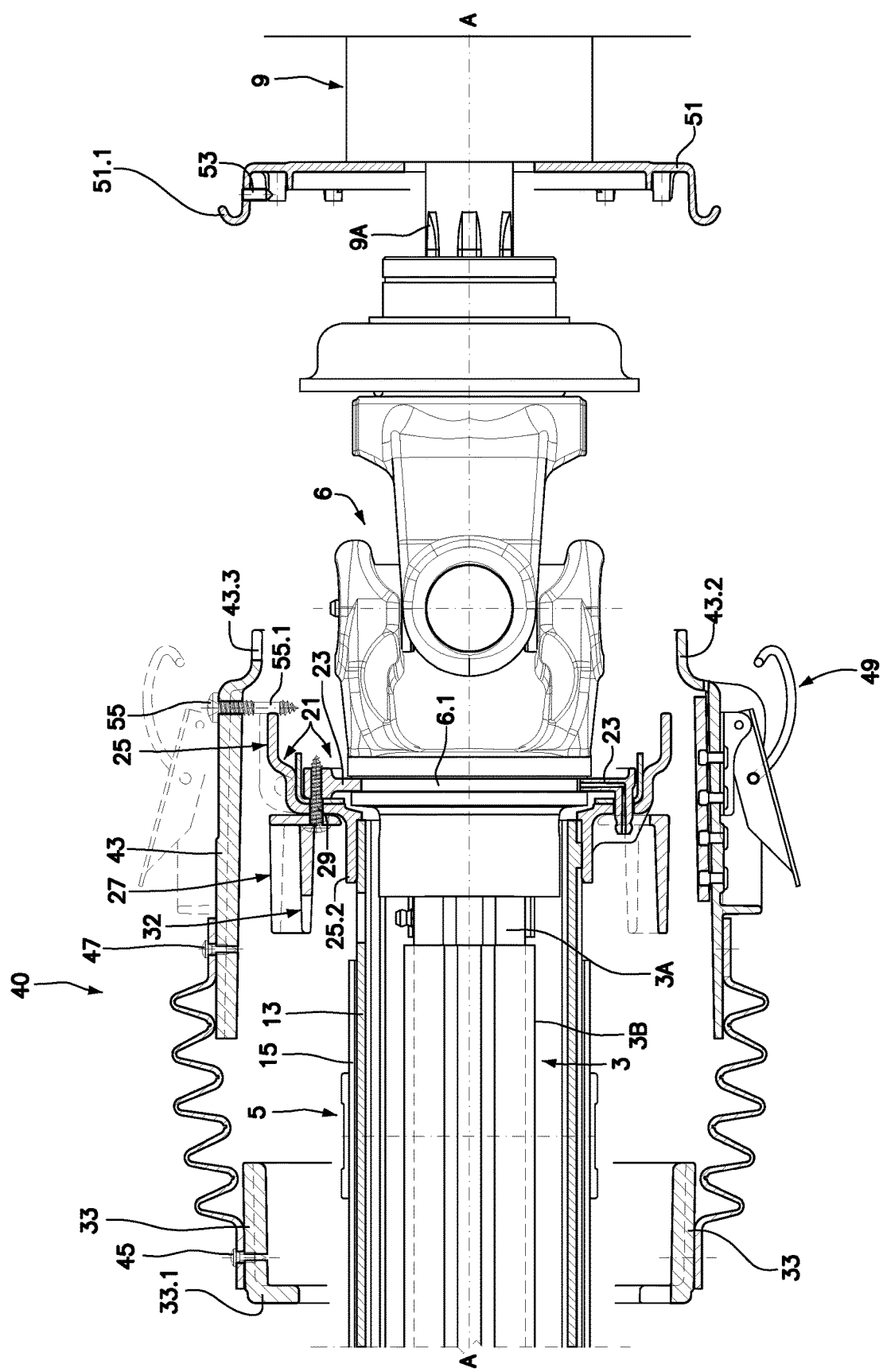
FIG. 4 is a cross-section similar to that of FIG. 2, with the protection partially open.

The operation of the protection system described so far is easily understood in particular from FIGS. 2 and 4. In FIG. 2 (as in FIGS. 1 and 3), the protection system 5 is mounted in the operative position. The protective boot 40 is positioned so as to fully cover both the universal joint 6 and the power take-off 9A. The protective boot 40 is anchored, by means of the hooks 49, to the stationary plate 51, which does not rotate, being for example bolted to the chassis of the vehicle on which the power take-off 9A is located. The above-described structure of the protection system 5 is such that the anchoring to the stationary plate 51 causes the entire protection system 5 to remain stationary, i.e. non-rotating, while the drive shaft 3, which is located therein, can rotate freely.

More particularly, the rigid half-boot 43 is torsionally anchored to the stationary plate 51 by means of the hooks 49 and therefore thanks to the friction between the stationary plate 51 and the rigid half-boot 43. For greater safety, in this position the screw 53 is inserted into the recess 43.3 preventing the rotation of the protective boot 40 with respect to the stationary plate 51.

The screws 47 rigidly connect the rigid half-boot 43 to the flexible half-boot 41. The latter is in turn torsionally coupled by means of the teeth 33.1 of the second annular element 33 to the seats 32 of the first annular element 21. As a result, the latter is ultimately torsionally coupled, i.e. angularly coupled to the stationary plate 51 and is hindered from rotating about the axis A-A. The second annular element 33 can discharge radial loads on the cylindrical portion 25.1 of the bushing 25, and more precisely on an outer cylindrical surface formed by the cylindrical portion 25.1. The radial loads are discharged from the bushing 25 onto the drive shaft 3 by means of the slider 23.

The tubular members 13, 15 are angularly coupled to each other and therefore they also cannot rotate with respect to the stationary plate 51 due to the connection between the tubular member 13 and the angular element 21. The protective boot 19 is rigidly connected to the tubular member 15 and therefore also hindered from rotating.

Ultimately, the entire protection system 5 is non-rotating. It rests on the drive shaft 3, by means of the sliders 23, and similar sliders associated with the universal joint 7.

Thus, the angular coupling provided by the teeth 33.1 of the second annular element 33 and by the sliding seats 32 of the first annular element 21, allows to avoid to use chains or other constraint elements between the protection system 5 and a fixed, i.e. non-rotating component of the machines to which the drive shaft 3 is associated.

Whenever there arises the need to access the universal joint 6, for example to disengage the drive shaft 3 from the power take-off 9A, it is sufficient to disengage the hooks 49 and retract the protective boot 40 away from the stationary plate 51 in the direction of the axis A-A of the drive shaft 3. FIG. 4 shows the protective boot 40 in a fully retracted position, which leaves the universal joint 6 accessible, which can thus be disengaged from the power take-off 9A. The screw 55 prevents the excessive retraction of the protective boot 40 and prevents it from being lost, even were the protective boot 19 at the opposite end of the drive shaft 3 is not present, for any reason.

The invention claimed is:

1. A protection system for a drive shaft, the protection system comprising:
    a first tubular member and a second tubular member which are slidably insertable into each other; and
    a protection at one end of the first tubular member; wherein the protection comprises: a protective boot; a first annular element coupled to the first tubular member; and a second annular element, which is torsionally couplable to the first annular element and decouplable therefrom by means of a mutual movement between the first annular element and the second annular element in a direction approximately parallel to the axis of the first tubular member, wherein the second annular element is coupled to the protective boot such that the protective boot moves integrally with the second annular member along the first tubular member when the second annular member is moved in said direction parallel to the axis of the first tubular member and the first tubular member remains stationary and the first annular member remains stationary with respect to the first tubular member; and the protective boot is provided with members for coupling to a non-rotating component of a machine.

2. The protection system of claim 1, wherein the protective boot comprises a first end and a second end; wherein the second annular element is constrained to the first end of the protective boot and an outer peripheral surface of the second annular element is on contact with the first end of the protective boot; and the coupling members are associated with the second end of the protective boot.

3. The protection system of claim 2, wherein the positive mechanical engagement between the first annular element and the second annular element is such to allow the protective boot to retract along the first tubular member, moving the second annular element away from the first annular element, the second annular element having an inner surface parallel to the axis of the first tubular member, the inner surface being in contact with the first annular element when the first annular element is torsionally coupled to the second annular element.

4. The protection system of claim 1, wherein the first annular element is rigidly constrained to an end of the first tubular member and is configured to be axially constrained to a universal joint of a drive shaft associated to the protection system.

5. The protection system of claim 1, wherein the first annular element and the second annular element are coupled to each other by means of a positive mechanical engagement with at least one coupling seat extending in the direction of the axis of the first tubular member and a tooth which slidably engageable in said coupling seat.

6. The protection system of claim 5, wherein the positive mechanical engagement is configured so as to prevent the protective boot from slipping off from the first tubular member.

7. The protection system of claim 6, wherein: the first annular element comprises a plurality of coupling seats, extending in the direction of the axis of the first tubular member; each coupling seat engaging a corresponding tooth of the second annular element.

8. The protection system of claim 1, wherein: the first annular element comprises at least one coupling seat, extending in the direction of the axis of the first tubular member; a tooth of the second annular element engages in the coupling seat, configuring a coupling which prevents relative rotation between the first annular element and the second annular element, allowing the relative sliding between the first annular element and the second annular element along the axis of the first tubular member.

9. The protection system of claim 8, wherein the coupling seat comprises an abutment which prevents the second annular element from slipping off from the end side of the first tubular member to which the first annular element is fixed, and is configured to allow the second annular element to slide in the opposite direction until it angularly releases the second annular element from the first annular element, removing the tooth from the coupling seat.

10. The protection system of claim 1, wherein the first annular element comprises:
    a bushing, constrained to which is at least one slider, adapted to form a support for the protection on a drive shaft associated with the protection system; and
    a flange rigidly connected to the bushing, forming part of the positive mechanical engagement between the first annular element and the second annular element.

11. The protection system of claim 10, wherein the first annular element and the second annular element are coupled to each other by means of a positive mechanical engagement with at least one coupling seat extending in the direction of the axis of the first tubular member and a tooth which slidably engageable in said coupling seat; and wherein the protective boot comprises a first end and a second end; wherein the second annular element is constrained to the first end of the protective boot; and the coupling members are associated with the second end of the protective boot; wherein the flange forms the at least one coupling seat.

12. The protection system of claim 10, wherein the bushing comprises an outer cylindrical resting surface on which the second annular element slides.

13. The protection system of claim 10, wherein the slider is adapted to form an axial coupling between the drive shaft and the first annular element.

14. The protection system of claim 1, wherein the protective boot comprises a flexible half-boot and a rigid half-boot, coupled to each other.

15. The protection system of claim 14, wherein: the flexible half-boot comprises an end edge, coupled to the second annular element; the rigid half-boot comprises an end edge associated with the coupling members; and the coupling members are fixed to the rigid half-boot.

16. The protection system of claim 15, wherein at least one coupling profile, adapted to co-act with an anti-rotation member constrained to the stationary plate, is provided along the end edge of the rigid half-boot.

17. The protection system of claim 15, wherein the end edge of the rigid half-boot has a diameter smaller than a maximum diameter of the rigid half-boot.

18. The protection system of claim 14, wherein the rigid half-boot comprises a plurality of ribs extending approximately in the direction of the axis of the first tubular member and angularly spaced from each other, in which mutual fixing members are engaged between the rigid half-boot and the flexible half-boot.

19. The protection system of claim 1, wherein the protective boot comprises an anti-slip-off member, which limits the mutual sliding movement between the protective boot and the first annular element.

20. The protection system of claim 19, wherein the anti-slip-off member comprises a radial screw, screwed into a hole of the rigid half-boot and protruding radially into the protective boot in the vicinity of the end edge of the rigid half-boot.

21. The protection system of claim 20, wherein the radial screw is configured with anti-unscrewing members.

22. The protection system of claim 20, wherein the radial screw has an interrupted thread and non-threaded stem portion.

23. The protection system of claim 4, wherein the first annular element includes a slider adapted to engage an annular groove of the universal joint.

24. A telescopic drive shaft, comprising:
a first shaft portion and a second shaft portion, slidably inserted into each other and torsionally coupled to each other;
a first universal joint constrained to one end of the first shaft portion;
a second universal joint constrained to one end of the second shaft portion; and
a protection system comprising:
a first tubular member and a second tubular member which are slidably insertable into each other; and
a protection at one end of the first tubular member; wherein the protection comprises a protective boot; a first annular element coupled to the first tubular member; and a second annular element, which is torsionally coupleable to the first annular element and decouplable therefrom by means of a mutual movement between the first annular element and the second annular element in a direction approximately parallel to the axis of the first tubular member, wherein the second annular element is coupled to the protective boot such that the protective boot moves integrally with the second annular member along the first tubular member when the second annular member is moved in said direction parallel to the axis of the first tubular member; and the protective boot is provided with members for coupling to a non-rotating component of a machine, wherein the protective boot is adapted to surround one of said first universal joint and said second universal joint.

25. The drive shaft of claim 24, wherein a further protective boot is fixed to one end of the second tubular member of the protection system, to surround the other of said first universal joint and second universal joint.

* * * * *